United States Patent
Grigorenko et al.

(10) Patent No.: US 11,643,561 B2
(45) Date of Patent: May 9, 2023

(54) PROCESS FOR THE PREPARATION OF METALLIC NANO-PARTICLE LAYERS AND THEIR USE FOR DECORATIVE OR SECURITY ELEMENTS

(71) Applicant: BASF SE, Ludwigshafen am Rhein (DE)

(72) Inventors: Nikolay A. Grigorenko, Basel (CH); Michelle Richert, Basel (CH)

(73) Assignee: BASF SE

(*) Notice: Subject to any disclaimer, the term of this patent is extended or adjusted under 35 U.S.C. 154(b) by 469 days.

(21) Appl. No.: 16/630,146

(22) PCT Filed: Jul. 25, 2018

(86) PCT No.: PCT/EP2018/070146
§ 371 (c)(1),
(2) Date: Jan. 10, 2020

(87) PCT Pub. No.: WO2019/020682
PCT Pub. Date: Jan. 31, 2019

(65) Prior Publication Data
US 2020/0230646 A1  Jul. 23, 2020

(30) Foreign Application Priority Data
Jul. 28, 2017 (EP) ..................... 17183732

(51) Int. Cl.
| | |
|---|---|
| C09D 11/101 | (2014.01) |
| C23C 18/14 | (2006.01) |
| C09D 11/033 | (2014.01) |
| C09D 7/61 | (2018.01) |
| C09D 7/63 | (2018.01) |
| B42D 25/373 | (2014.01) |
| C09D 7/40 | (2018.01) |
| B05D 3/00 | (2006.01) |
| B05D 5/06 | (2006.01) |
| B42D 25/378 | (2014.01) |

(52) U.S. Cl.
CPC ............ *C09D 11/101* (2013.01); *B05D 3/002* (2013.01); *B05D 5/067* (2013.01); *B42D 25/373* (2014.10); *C09D 7/61* (2018.01); *C09D 7/63* (2018.01); *C09D 7/66* (2018.01); *C09D 11/033* (2013.01); *C23C 18/143* (2019.05); *B05D 2401/10* (2013.01); *B05D 2601/02* (2013.01); *B42D 25/378* (2014.10)

(58) Field of Classification Search
CPC .......... C09D 11/101; C09D 7/61; C09D 7/63; C09D 7/66; C09D 11/033; C09D 11/52; B05D 3/002; B05D 5/067; B05D 2401/10; B05D 2601/02; B42D 25/373; B42D 25/378; C23C 18/143; C23C 18/08
See application file for complete search history.

(56) References Cited

U.S. PATENT DOCUMENTS

| | | | |
|---|---|---|---|
| 4,913,858 A | 4/1990 | Miekka et al. | |
| 5,164,227 A | 11/1992 | Miekka et al. | |
| 7,629,017 B2 | 12/2009 | Kodas et al. | |
| 8,066,805 B2* | 11/2011 | Zurcher | C23C 18/44 427/343 |
| 2003/0124259 A1 | 7/2003 | Kodas et al. | |
| 2004/0121257 A1* | 6/2004 | Kaminsky | B42D 25/378 428/913 |
| 2006/0043346 A1 | 3/2006 | Kodas et al. | |
| 2006/0130700 A1 | 6/2006 | Reinartz | |
| 2009/0159121 A1* | 6/2009 | Yang | B22F 9/24 428/323 |
| 2010/0090455 A1 | 4/2010 | Boswell et al. | |
| 2010/0167081 A1 | 7/2010 | Kim et al. | |
| 2011/0059234 A1* | 3/2011 | Byun | H01B 1/026 252/514 |
| 2011/0151117 A1 | 6/2011 | Seo et al. | |
| 2014/0030426 A1 | 1/2014 | Kim et al. | |
| 2014/0178601 A1 | 6/2014 | Wei et al. | |
| 2017/0210930 A1 | 7/2017 | Walker | |

FOREIGN PATENT DOCUMENTS

| | | |
|---|---|---|
| CN | 101511952 A | 8/2009 |
| CN | 105093843 A | 11/2015 |
| DE | 10 2010 004 181 A1 | 5/2011 |
| EP | 1 504 923 A2 | 2/2005 |

(Continued)

OTHER PUBLICATIONS

International Search Report dated Sep. 26, 2018 in PCT/EP2018/070146, 4 pages.
International Preliminary Report on Patentability dated Jan. 28, 2020 in PCT/EP2018/070146 filed Jul. 25, 2018, 9 pages.
Extended European Search Report dated Feb. 19, 2018 in Patent Application No. 17183732.1, 4 pages.
Kate Black, et al., "Silver Ink Formulations for Sinter-free Printing of Conductive Films", Scientific Reports, vol. 6, Feb. 9, 2016, 7 pages.

(Continued)

*Primary Examiner* — Jessica M Roswell
(74) *Attorney, Agent, or Firm* — Faegre Drinker Biddle & Reath LLP

(57) ABSTRACT

The present invention relates to a process for the preparation of thin silver nano-particles containing layers, which are produced directly on a substrate as part of a coating or printing process. The layers can show different colours in transmittance and reflectance. The invention further relates to decorative and security elements. When the layers are applied over a security element, such as a hologram, the obtained products may show different colours in reflection and transmission, an extremely bright optically variable image (OVD image). Depending on the thickness of the layer a more or less intensive metallic aspect appears.

10 Claims, No Drawings

(56) References Cited

FOREIGN PATENT DOCUMENTS

| | | |
|---|---|---|
| JP | 3-258589 A | 11/1991 |
| JP | 4-40448 A | 2/1992 |
| WO | WO 01/03945 A1 | 1/2001 |
| WO | WO 01/53113 A1 | 7/2001 |
| WO | WO 03/032084 A2 | 4/2003 |
| WO | WO 2005/038136 A1 | 4/2005 |
| WO | WO 2005/051675 A2 | 6/2005 |
| WO | WO 2008/055807 A2 | 5/2008 |
| WO | WO 2008/061930 A1 | 5/2008 |
| WO | WO 2011/126706 A2 | 10/2011 |
| WO | WO 2012/176126 A1 | 12/2012 |
| WO | WO 2013/096664 A1 | 6/2013 |
| WO | WO 2015/049262 A1 | 4/2015 |
| WO | WO 2016/156286 A1 | 10/2016 |
| WO | WO 2016/170160 A1 | 10/2016 |
| WO | WO 2016/173696 A1 | 11/2016 |

OTHER PUBLICATIONS

U.S. Appl. No. 16/613,714, filed Nov. 14, 2019, Nikolay A Grigorenko, et al.

U.S. Appl. No. 16/631,617, filed Jan. 16, 2020, Reinhold Oehrlein, et al.

\* cited by examiner

PROCESS FOR THE PREPARATION OF METALLIC NANO-PARTICLE LAYERS AND THEIR USE FOR DECORATIVE OR SECURITY ELEMENTS

The present invention relates to a process for the preparation of thin silver nano-particles containing layers, which are produced directly on a substrate as part of a coating or printing process. The layers can show different colours in transmittance and reflectance. The invention further relates to decorative and security elements. When the layers are applied over a security element, such as a hologram, the obtained products may show different colours in reflection and transmission and an extremely bright optically variable image (OVD image). Depending on the thickness of the layer a more or less intensive metallic aspect appears.

WO2008/061930 discloses a method for forming an optically variable image on a substrate comprising the steps of: A) applying a curable compound, or composition to at least a portion of the substrate; B) contacting at least a portion of the curable compound with optically variable image forming means; C) curing the curable compound and D) optionally depositing a metallic ink on at least a portion of the cured compound, wherein the optically variable image forming means comprise a) a transparent carrier, b) a transparent material which carries an optically variable image to be applied, and c) means to dry or cure a varnish.

DE102010004181 describes the preparation of silver or gold carboxylate complexes with an alkin ligand. These complexes serve as metal precursors in chemical vapour deposition processes (CVD).

WO2011/126706 discloses conductive films prepared from a silver complex formed by reaction of silver formicate or oxalate with an amine. These complexes may be part of a conductive ink which can be used in a printing process. The printed film is sintered and the layer exhibits a typical metallic conductivity.

US2006/0130700 describes a first ink jet ink containing a silver salt and an amine and a second ink jet ink containing a reducing agent. Both ink jet inks, when applied to a substrate subsequently or concurrently lead to a metallic pattern on the substrate.

WO2013/096664 discloses an ink composition and a method of making a conductive silver structure. The ink composition comprises a silver salt and a complex of a complexing agent and a salt of a short chain carboxylic acid. The complexing agent is, for example an alkyl amine or ammonia.

JP3-258589A relates to a method for producing an optical recording material, in which a reflective recording layer obtained by dispersing metal silver particles in a hydrophobic binder is laminated with a transparent substrate, and recording/reproduction is optically performed by way of the transparent substrate, wherein a silver catalyst nucleus or a catalyst nucleus comprising a metal nobler than silver is formed on a transparent substrate having transmittance of recording/reproduction light of 85% or greater and birefringence of 100 nm or less with a double pass, with substantially no change in reflectance, then a silver salt composition comprising an organic silver salt oxidant, a reducing agent and a hydrophobic binder is formed, and heating is then carried out at 100-200° C., whereby a metal silver particle-dispersed layer is densely formed on the substrate surface side of the silver salt composition and the reflectance through the transparent substrate is 10-90%.

JP4-40448A describes an optical recording material obtained by dispersing, in a hydrophobic binder, reflective metal microparticles obtained by reducing an organic silver salt compound and a compound of a metal other than silver.

US20030124259A1 (U.S. Pat. No. 7,629,017) relates to a metal precursor composition having a viscosity of at least about 1000 centipoise, comprising: (a) a metal precursor compound; and (b) a conversion reaction inducing agent in an amount sufficient to reduce the conversion temperature of said metal precursor composition by at least about 25° C. as compared to the dry metal precursor compound, wherein said conversion temperature is not greater than about 200° C.;

and to a method for the fabrication of a conductive feature on a substrate, comprising the steps of: (a) providing a precursor composition comprising a metal precursor compound, wherein said precursor composition has a viscosity of at least about 1000 centipoise; (b) depositing said precursor composition on a substrate; and (c) heating said precursor composition to a conversion temperature of not greater than about 200° C. to form a conductive feature, wherein said conductive feature has a resistivity of not greater than about 10 times the resistivity of the pure bulk metal.

WO2003032084A2 relates to a metal precursor composition having a viscosity of not greater than 1000 centipoise, comprising: (a) a metal precursor compound; and (b) a conversion reaction inducing agent in an amount sufficient to reduce the conversion temperature of said metal precursor composition by at least about 25° C. compared to the dry metal precursor compound, wherein the conversion temperature of said metal precursor composition is not greater than about 200° C.; and a method for the fabrication of a conductive feature on a substrate, comprising the steps of: (a) providing a precursor composition comprising a silver metal precursor compound, wherein said precursor composition has a viscosity of not greater than about 50 centipoise and a surface tension of from about 20 to 50 dynes/cm; (b) depositing said precursor composition on a substrate; and (c) converting said precursor composition to a conductive feature by heating said precursor composition to a conversion temperature of not greater than about 250° C., wherein said conductive feature has a resistivity of not greater than about 10 times the resistivity of the pure bulk silver.

WO2016/170160 describes a method for forming an electrically non-conductive silver nanoparticles-containing layer on a substrate in a coating or printing process comprising the steps A) coating or printing an ink composition on a substrate comprising a) a silver compound or a mixture of silver compounds, b) an alkine compound of formula (I), (II), (IIa), (III) or (IV), c) optionally a solvent and/or an organic binder and/or reducing agent and/or formulation stabilizer and B) heating the coated or printed substrate to a temperature of from 30° C. to 200° C. or applying electromagnetic radiation, preferably ultraviolet (UV) light or an electron beam.

US2010167081 describes a catalyst precursor resin composition including an organic polymer resin; a fluorinated-organic complex of silver ion; a monomer having multi-functional ethylene-unsaturated bonds; a photoinitiator; and an organic solvent. A metallic pattern is formed by forming catalyst pattern on a base using the catalyst precursor resin composition reducing the formed catalyst pattern, and electroless plating the reduced catalyst pattern.

US2014178601 relates to a method for making a conductive network of sintered silver comprises preparing a conductive ink comprising a silver compound and a binder; depositing the conductive ink on a substrate and applying an external energy source to the deposited conductive ink to dry the ink; and applying an external energy source to the dried ink to decompose the ink to elemental silver and to sinter the elemental silver into a conductive network.

US2011151117 relates to a method for forming a metal thin layer, comprising: preparing a substrate consisting of organic or inorganic material; forming a metal thin layer by applying the ink to the substrate, in which the ink includes organic metal complexes comprising Ag and a ligand represented by the following general formula (1), and an organic solvent; and heat-treating the substrate:

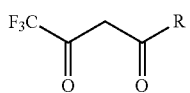
(1)

where: R is an alkyl or an aryl group with carbon number of 1 to 3. The heat-treatment is performed at less than 300° C. R is preferably a phenyl group. the organic solvent is one or more selected from the group consisting of methanol, ethanol, isopropanol, butanol, ethylene glycol, glycerol, diethylene glycol, ethyl acetate, butyl acetate, propyl acetate, methyl ethyl ketone, acetone, benzene, and toluene.

CN105093843 discloses a method for forming a silver-containing conductive pattern layer, wherein the method comprises coating a photosensitive composition on a substrate so that the photosensitive composition and the substrate is subjected to UV light curing, to form a conductive pattern layer containing silver, wherein the photosensitive composition comprises a solvent, a photoinitiator, a fluorine-containing organic silver complex, a low index of refraction material and a photo-polymerizable monomer and/or oligomer.

US2014/030426 discloses a catalyst precursor resin composition for forming a metallic silver pattern comprising a fluorinated organic complex of a silver ion.

US2017/210930 discloses a process for forming conductive silver structures comprising the steps of (see Example 3):
applying a composition on a substrate, wherein the composition comprises silver hexafluoroacetylacetonate as a precursor, xylene as a dissolving agent and tert-octylamine as a reducing agent;
heating the coating at a temperature of about 160° C. to form a metallic, conductive structure having a metallic silver luster. The conductive structure has an electrical conductivity from about $2\times10^{-6}$ Ohm-cm to about $1\times10^{-5}$ Ohm-cm. The specular reflectance of the conductive structure is a byproduct of the extremely low root mean square (RMS) values of the conductive structure. The RMS value of the conductive structure is about 10 nanometers or less.

Kate Black et al., Scientific Reports 6, 20814, DOI: 10.1038/srep20814 (2016) disclose a process for printing conductive silver films comprising the steps of (see section Results and discussion; FIG. 2):
printing a composition on a glass substrate, wherein the composition comprises silver hexafluoroacetylacetonate cyclooctadiene as a precursor, toluene as a solvent and propan-2-ol as a reducing agent;
heating the substrate and the coating at a temperature above 110° C. to form a conductive film implicitly comprising silver nanoparticles.

It was the object of the present invention to provide a process for the preparation of highly reflective thin silver nano-particle layers, which are produced directly on a substrate as part of a coating or printing process. Advantageously, the curing temperature shall be low, i.e. below 120° C., especially below 100° C. which allows printing or coating process to be carried out at relatively high speed on temperature-sensitive substrates. At the same time, the ink formulation shall be stable for several hours at room temperature.

The present invention is directed to a method for forming silver nanoparticles-containing layer on a substrate comprising the steps
A) optionally forming a surface relief microstructure, especially an optically variable device (OVD) on a discrete portion of the substrate;
B) applying a composition on at least part of the substrate, and/or optionally at least part of the surface relief microstructure, especially OVD obtained in step A), wherein the composition comprises
b1) a metal complex of formula $Ag^+L^-$ (I), wherein
$L^-$ is a group of formula

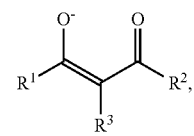
(II)

$R^1$ is a perfluoroalkyl group, or a $C_1$-$C_8$alkyl group, wherein part of the hydrogen atoms is replaced by fluorine atoms;
$R^2$ is a perfluoroalkyl group, a $C_1$-$C_8$alkyl group, a $C_1$-$C_8$alkyl group, wherein part of the hydrogen atoms is replaced by fluorine atoms; a phenyl group, which may optionally be substituted by one or more $C_1$-$C_4$alkyl groups, or $C_1$-$C_4$alkoxy groups; a $C_2$-$C_5$heteroaryl group, which may optionally be substituted by one or more $C_1$-$C_4$alkyl groups, or $C_1$-$C_4$alkoxy groups; or a $C_1$-$C_8$alkoxy group,
$R^3$ is a hydrogen atom, a fluorine atom, a chlorine atom, or a $C_1$-$C_8$alkyl group, or
$R^2$ and $R^3$ together form a cyclic or bicyclic ring, which may optionally be substituted by one or more $C_1$-$C_4$alkyl groups,
b2) a solvent,
b3) a reducing agent, and
b4) optionally a polymeric binder, and
b5) optionally a dispersant,
C) heating the coating obtained in step B) to a temperature below 120° C., especially 30 to 100° C. and/or irradiating the coating with electromagnetic radiation, to form a highly reflective layer, containing silver nanoparticles.

The silver nanoparticles containing layers show high gloss and, optionally, different colours in transmittance and reflectance.

Applying the method according to the invention results in highly reflective layers (comprising silver nanoparticles) having a gloss value, as measured under a 20° geometry, higher than 300, especially higher than 400, very especially higher than 500 relative gloss units.

Gloss measurements are well known measurements in the coatings and printing industry and are, for example, carried out with a Hunter or Zehnter ZGM 1120 gloss meter according to ISO 2813; in this case with a 20° geometry.

The invention further relates to decorative and security elements. When the silver nanoparticles containing layers are applied over a security element, such as a hologram, the obtained products can show also different colours in reflection and transmission, an extremely bright optically variable image (OVD image). Depending on the thickness of the layer a more or less intensive metallic appearance can be obtained.

The silver nanoparticles containing layers can be conductive, or non-conductive.

In a preferred embodiment, the silver nanoparticles containing layers are non-conductive.

In the context of the present invention the term "(electrically) non-conductive" means that typically the resistance of the layer after heating (the layer obtained in step C) is higher than $1*10^3$ Ω/sq, as measured by the four-point probe method. The four-point probe method is widely known and for example described in more detail in Smits, F. M., "Measurements of Sheet Resistivity with the Four-Point Probe", BSTJ, 37, p. 371 (1958). Preferably the sheet resistance of the layer after step C) is higher than $1*10^4$ Ω/sq as measured by four-point probe method.

In said embodiment the silver nanoparticles containing layers do not show the typical conductivity of metallic layers, since the particles are essentially discrete particles which are not sintered.

The silver layer obtained by the above process is not a continuous metallic silver layer, but comprises preferably discrete separated nano-particles. The nano-particles are spherical and/or of anisotropic shape. Typically, the longest dimension or diameter of particles is from 0.5 nm to 500 nm, preferably from 0.5 nm to 300 nm, in particular from 1 to 200 nm. The resulting layer or coating shows high gloss and optionally a certain color in transmission and a different colour in reflection.

In another preferred embodiment, the silver nanoparticles containing layers are conductive. In the context of the present invention the term "(electrically) conductive" means that typically the resistance of the layer after heating (the layer obtained in step C) is less than $1*10^3$ Ω/sq, as measured by the four-point probe method. Preferably the sheet resistance of the layer after step C) is less than $10^2$ Ω/sq as measured by four-point probe method.

In said embodiment the silver layer obtained by the above process is a metallic silver layer, comprising silver nanoparticles, which are in electrical contact with each other. The nano-particles are spherical and/or of anisotropic shape. Typically, the longest dimension or diameter of particles is from 0.5 nm to 500 nm, preferably from 0.5 nm to 300 nm, in particular from 1 to 200 nm. The resulting layer or coating shows high gloss and optionally a certain color in transmission and a different colour in reflection.

The composition of the present invention can be applied via a coating process or a printing process.

In general printing processes are preferred. Typical printing processes, which can be applied, are described below.

The highly reflective layer, containing silver nanoparticles, can be formed and/or the coating can be cured by heating the coated or printed substrate to a temperature of from 30 to 120° C., especially 30 to 100° C., and/or by applying electromagnetic radiation, preferably ultraviolet (UV) light, or an electron beam.

Preferably the electromagnetic radiation is ultraviolet (UV) light or an electron beam.

In case of irradiation with UV light, the usual UV light sources known in the art can be applied such as e.g. mercury lamps (optionally doped; exhibiting an intensity in the range of e.g. 100 to 400 W/cm², preferred 150 to 250 W/cm²), UV LEDs, lasers, high-intensity lamps (e.g. PulseForge® tool from Novacentrix). Preferably, the wavelength of the UV light sources is chosen in the range of from 200 to 400 nm.

The chosen exposure time depends on the used intensity, light source, layer thickness and curable composition, but usually is within the range of from 1 microsecand to 60 seconds, preferably from 10 microseconds to 20 seconds.

The highly reflective layer, containing silver nanoparticles, is preferably formed and/or the coating is preferably cured by heating the coated or printed substrate to a temperature of from 30 to 120° C., especially 30 to 100° C.

As a rule, the heating step is carried out under atmospheric conditions and under normal pressure, for 0.1 seconds to 1000 seconds, preferably from 0.1 seconds to 500 seconds, most preferably from 0.5 to 50 seconds.

Prior to step C) a solvent evaporation step may be integrated, succeeding, for example, through thermal drying at a temperature in the range of from 20° C. to 120° C.

The final silver containing layer formed in step C) exhibits typically a thickness from 1 nm to 1000 nm, preferably from 1 nm to 500 nm, most preferably from 2 to 200 nm.

The composition normally comprises:
a total content of metal complex of formula (I) of from 0.1 to 60% by weight, preferably 0.5 to 40% by weight, more preferably 1 to 30% by weight based on the total weight of the composition.

a total content of solvent of from 10 to 99.5% by weight, preferably 50 to 99% by weight based on the total weight of the composition.

a total content of the reducing agent of from 0.01 to 50% by weight, preferably 0.01 to 30% by weight, more preferably 0.01 to 10% by weight based on the total weight of the composition.

a total content of a polymeric binder of from 0 to 40% by weight, preferably 0 to 20% by weight, more preferably 1 to 10% by weight based on the total weight of the composition.

a total content of dispersant of from 0 to 40% by weight, preferably 0 to 10% by weight, more preferably 0 to 5% by weight based on the total weight of the composition.

Generally, the final composition should be in form of a solution in order to obtain highly reflective silver nanoparticles containing layer. Advantageously, the composition is prepared from two different solutions shortly before printing. One solution contains the metal complex of formula (I) and the other solution contains the reducing agent.

The composition comprises a metal complex of formula $Ag^+L^-$ (I), wherein
$L^-$ is a group of formula

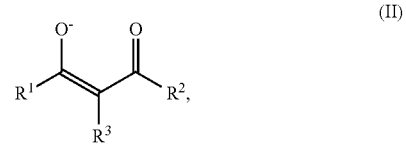

$R^1$ is a perfluoroalkyl group, or a $C_1$-$C_8$alkyl group, wherein part of the hydrogen atoms is replaced by fluorine atoms;

$R^2$ is a perfluoroalkyl group, a $C_1$-$C_8$alkyl group, a $C_1$-$C_8$alkyl group, wherein part of the hydrogen atoms is replaced by fluorine atoms; a phenyl group, which may optionally be substituted by one or more $C_1$-$C_4$alkyl groups, or $C_1$-$C_4$alkoxy groups; a $C_2$-$C_5$heteroaryl group, which may optionally be substituted by one or more $C_1$-$C_4$alkyl groups, or $C_1$-$C_4$alkoxy groups; or a $C_1$-$C_8$alkoxy group, $R^3$ is a hydrogen atom, a fluorine atom, a chlorine atom, or a $C_1$-$C_8$alkyl group, or $R^2$ and $R^3$ together form a cyclic or bicyclic ring, which may optionally be substituted by one or more $C_1$-$C_4$alkyl groups.

The metal complex of formula $Ag^+L^-$ (I) may be generated in situ. For example, a silver compound which is selected from silver oxide, silver hydroxide, silver complexes with non-fluorinated beta-diketones and beta-ketoesters and mixtures thereof may be reacted with a compound of formula $H^+L^-$, wherein $L^-$ is as defined above, or below, to obtain the metal complex of formula (I). Silver oxide and silver hydroxide are preferred. In said embodiment the ratio of silver compound to compound of formula $H^+L^-$ is in the range of from 1:1 to 1:1.5. An excess of compound of formula $H^+L^-$ may be beneficial for storage stability of the composition.

The compound of formula $H^+$ $L^-$ is selected from

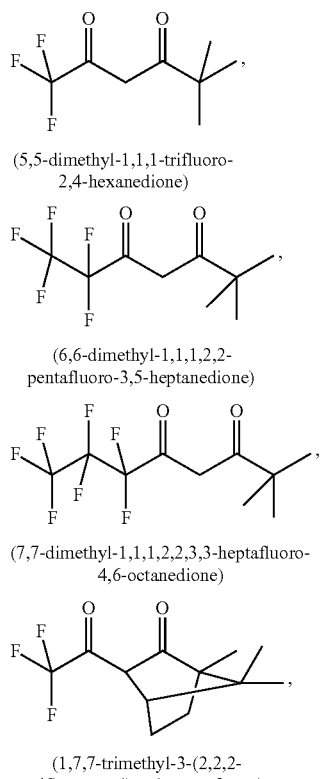

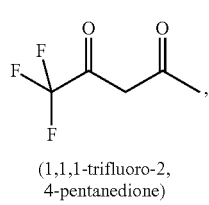

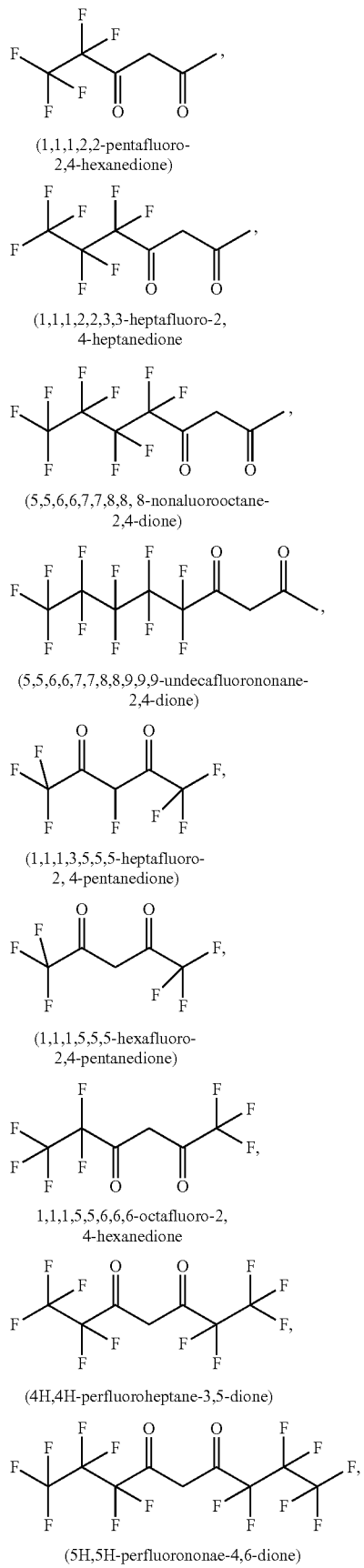

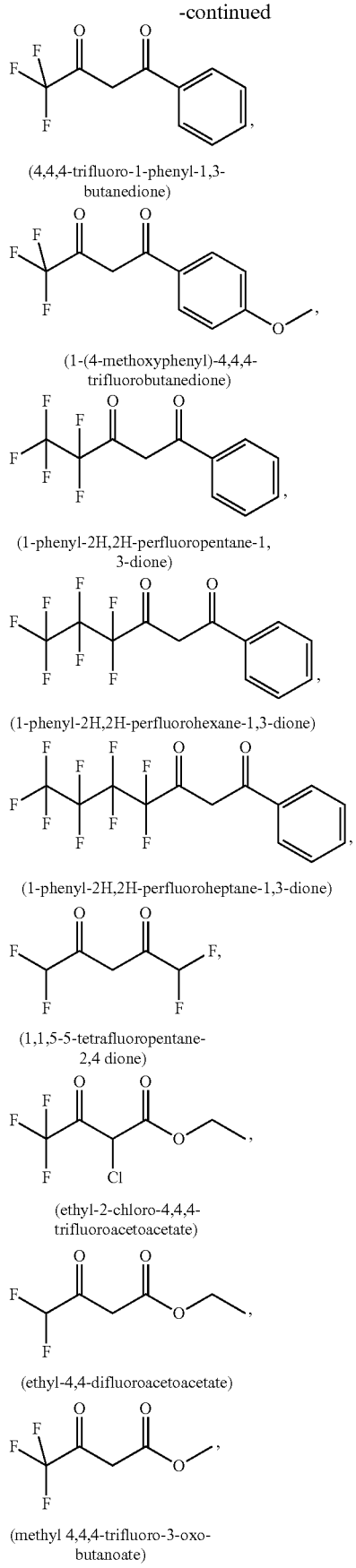
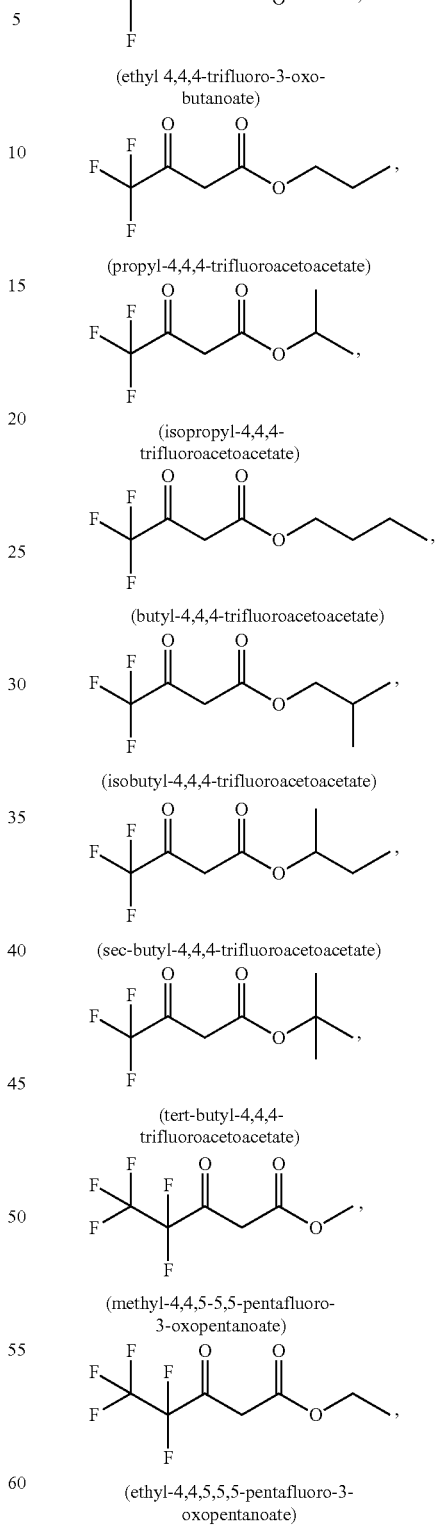
and mixtures thereof.
Compounds of formula H⁺L⁻, which have a boiling point of below 220° C., especially below 160° C. at atmospheric pressure, are preferred.

Metal complexes of formula $Ag^+L^-$ (I) are preferred, wherein the deprotonated form of the above-mentioned compounds of formula $H^+L^-$ represents $L^-$ in formula (I).

Due to the insufficient stability metal complexes of formula $Ag^+L^-$ (I), wherein $L^-$ is a group of formula

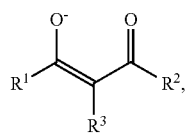
(II)

wherein $R^2$ is a $C_1$-$C_{18}$alkoxy group, are usually prepared in-situ.

Metal complexes of formula

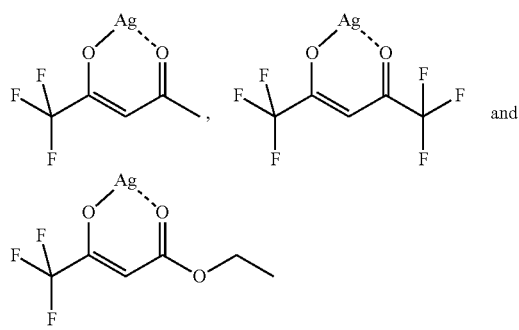

are most preferred and are preferably generated in situ reacting silver oxide, silver hydroxide, or silver complexes with non-fluorinated beta-diketones and beta-ketoesters with a compound of formula

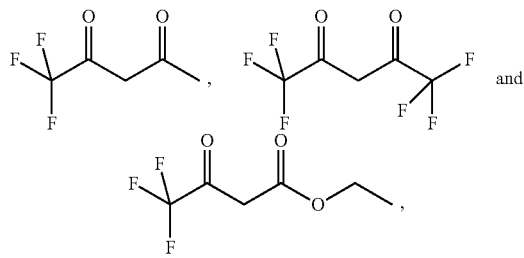

respectively.

The solvent is preferably selected from alcohols (such as methanol, ethanol, 1-propanol, 2-propanol, 1-butanol, 2-butanol, isobutanol, tert-butanol, tert-pentanol), cyclic or acyclic ethers (such as diethyl ether, tetrahydrofuran and 2-methyl-tetrahydrofurane), ketones (such as acetone, 2-butanone, 3-pentanone), ether-alcohols (such as 2-methoxyethanol, 1-methoxy-2-propanol, ethylene glycol monobutyl ether, diethylene glycol monoethyl ether, diethylene glycol monopropyl ether, and diethylene glycol monobutyl ether), esters (such as ethyl acetate, ethyl propionate, and ethyl 3-ethoxypropionate), polar aprotic solvents (such as acetonitrile, dimethyl formamide, and dimethyl sulfoxide), mixtures thereof and mixtures with water. The preferred solvents include $C_2$-$C_6$ alcohols, ethers, ether-alcohols, mixtures thereof and mixtures with water.

The solvent may be present in the (coating or printing ink) composition in an amount of from 10 to 99.5% by weight of the (coating or printing ink) composition, preferably 50 to 99% by weight.

Examples of the reducing agents are 1,2-diols, such as glycerol, ethylene glycol, 1,2-propandiol, 1,2-butanediol, 1,2-pentanediol, 2,3-butanediol, 1,2-hexanediol, 2,3-butanediol, cis- or trans-1,2-cyclopentanediol, cis- or trans-1,2-cyclohexanediol and erythritol, or aldehyde, such as glutaric dialdehyde. Glycerol and glutaric dialdehyde are preferred. Glycerol is most preferred.

Examples of $C_1$-$C_8$alkyl are methyl, ethyl, n-, i-propyl, n-butyl, i-butyl, sec.-butyl, tert.-butyl, n-pentyl, neopentyl, n-hexyl.

Examples of $C_1$-$C_8$alkoxy are methoxy, ethoxy, n-propoxy, isopropoxy, n-butoxy, sec.-butoxy, isobutoxy, tert.-butoxy, n-pentyloxy, 2-pentyloxy, 3-pentyloxy, 2,2-dimethylpropoxy, n-hexyloxy, n-heptyloxy, n-octyloxy, 1,1,3,3-tetramethylbutoxy and 2-ethylhexyloxy.

A perfluoroalkyl group is, for example, a $C_1$-$C_8$perfluoroalkyl agroup, which is a branched or unbranched radical, such as, for example: $-CF_3$, $-CF_2CF_3$, $-CF_2CF_2CF_3$, $-CF(CF_3)_2$, $-(CF_2)_3CF_3$, $-(CF_2)_4CF_3$, $-C(CF_3)_3$.

A $C_1$-$C_8$alkyl group, wherein part of the hydrogen atoms is replaced by fluorine atoms, is, for example, $-CHF_2$.

A phenyl group, which may optionally be substituted by one or more, especially one to three $C_1$-$C_4$alkyl groups, or $C_1$-$C_4$alkoxy groups, is, for example, phenyl, 4-methoxyphenyl, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_2$-$C_5$heteroaryl, i.e. a ring with five to six ring atoms, wherein nitrogen, oxygen or sulfur are the possible hetero atoms, and is typically an unsaturated heterocyclic radical with five to 7 atoms having at least six conjugated π-electrons such as thienyl, furyl, furfuryl, 2H-pyranyl, pyrrolyl, imidazolyl, pyrazolyl, pyridyl, bipyridyl, triazinyl, pyrimidinyl, pyrazinyl, or pyridazinyl, which can be unsubstituted or substituted. Possible substituents are $C_1$-$C_4$alkyl, or $C_1$-$C_4$alkoxy.

An example of a cyclic or bicyclic ring, which may optionally be substituted by one or more $C_1$-$C_4$alkyl groups is a group of formula

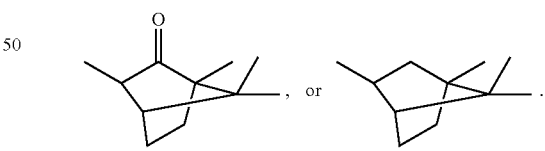

Examples of $C_1$-$C_4$alkyl are methyl, ethyl, n-, i-propyl, n-butyl, i-butyl, sec.-butyl, tert.-butyl.

As substrate the usual substrates can be used. The substrates can be plain such as in metallic (e.g. Al foil) or plastic foils (e.g. PET foil), but paper is regarded also as a plain substrate in this sense.

Non-plain substrates or structured substrates comprise a structure, which was intentionally created, such as a hologram, or any other structure, created, for example, by embossing.

It is widely known to use in banknotes security elements in the form of strips or threads.

The method of the instant invention could replace the security elements in the form of strips or threads used in banknotes, which are made from a transparent film provided with a continuous reflective metal layer, vacuum deposited aluminium on polyester film being the commonest example.

The colours in transmission and reflection are dependent on the light-absorption spectrum of the coating and the colour in reflection may be complementary to the colour in transmission in the physical sense.

The compositions, preferably printing ink compositions may comprise a binder. Generally, the binder is a high-molecular-weight organic compound conventionally used in coating compositions. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

With respect to the binder resin, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly(vinyl butyral) (PVB), poly(vinyl alcohol) (PVA), poly(vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN), also known as nitrocellulose], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

The binder preferably comprises nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythylene-terephthalate, terpene phenol, polyolefin, silicone, cellulose, polyamide, polyester, rosin ester resins, shellac and mixtures thereof, most preferred are soluble cellulose derivatives such as hydroxylethyl cellulose, hydroxypropyl cellulose, nitrocellulose, carboxymethylcellulose as well as chitosan and agarose, in particular hydroxyethyl cellulose and hydroxypropyl cellulose.

Usually, the weight-ratio of binder to the total silver content (i.e. amount of silver equivalent to elementary silver) in the coating or printing coating or printing ink composition is chosen in the range of from 0.001 to 100, preferably from 0.001 to 10, most preferably 0.001 to 1.

The (coating or printing ink) compositions may also comprise an additional colorant. Examples for suitable dyes and pigments are given subsequently.

The (coating or printing ink) composition may also contain a surfactant. In general surfactants change the surface tension of the composition. Typical surfactants are known to the skilled person, they are for example, anionic or non-ionic surfactants. Examples of anionic surfactants can be, for example, a sulfate, sulfonate or carboxylate surfactant or a mixture thereof. Preference is given to alkylbenzenesulfonates, alkyl sulfates, alkyl ether sulfates, olefin sulfonates, fatty acid salts, alkyl and alkenyl ether carboxylates or to an α-sulfonic fatty acid salt or an ester thereof.

Preferred sulfonates are, for example, alkylbenzenesulfonates having from 10 to 20 carbon atoms in the alkyl radical, alkyl sulfates having from 8 to 18 carbon atoms in the alkyl radical, alkyl ether sulfates having from 8 to 18 carbon atoms in the alkyl radical, and fatty acid salts derived from palm oil or tallow and having from 8 to 18 carbon atoms in the alkyl moiety. The average molar number of ethylene oxide units added to the alkyl ether sulfates is from 1 to 20, preferably from 1 to 10. The cation in the anionic surfactants is preferably an alkaline metal cation, especially sodium or potassium, more especially sodium. Preferred carboxylates are alkali metal sarcosinates of formula $R_9$—$CON(R_{10})CH_2COOM_1$ wherein $R_9$ is $C_9$-$C_{17}$alkyl or $C_9$-$C_{17}$alkenyl, $R_{10}$ is $C_1$-$C_4$alkyl and $M_1$ is an alkali metal such as lithium, sodium, potassium, especially sodium.

$C_9$-$C_{17}$alkyl means n-, i-nonyl, n-, i-decyl, n-, i-undecyl, n-, i-dodecyl, n-, i-tridecyl, n-, i-tetradecyl, n-, i-pentadecyl, n-, i-hexadecyl, n-, i-heptadecyl.

$C_9$-$C_{17}$alkenyl means n-, i-nonenyl, n-, i-decenyl, n-, i-undecenyl, n-, i-dodecenyl, n-, i-tridecenyl, n-, i-tetradecenyl, n-, i-pentadecenyl, n-, i-hexadecenyl, n-, i-heptadecenyl.

The non-ionic surfactants may be, for example, a primary or secondary alcohol ethoxylate, especially a $C_8$-$C_{20}$aliphatic alcohol ethoxylated with an average of from 1 to 20 mol of ethylene oxide per alcohol group. Preference is given to primary and secondary $C_{10}$-$C_{15}$ aliphatic alcohols ethoxylated with an average of from 1 to 10 mol of ethylene oxide per alcohol group. Non-ethoxylated non-ionic surfactants, for example alkylpolyglycosides, glycerol monoethers and polyhydroxyamides (glucamide), may likewise be used.

Further in addition, an auxiliary agent including a variety of reactive agents for improving drying property, viscosity, and dispersibility, may suitably be added. The auxiliary agents are to adjust the performance of the ink, and for example, a compound that improves the abrasion resistance of the ink surface and a drying agent that accelerates the drying of the ink and the like may be employed.

Furthermore, a plasticizer for stabilizing the flexibility and strength of the print film may be added according to the needs therefor.

The (coating or printing ink) composition may further contain a dispersant. The dispersant may be any polymer which prevents agglomeration or aggregation of the spherical and shaped particles formed after heating step C). The dispersant may be a non-ionic, anionic or cationic polymer having a weight average molecular weight of from 500 to 2,000,000 g/mol, preferably from 1,500,000 to 1,000,000 g/mol, which forms a solution or emulsion in the aqueous mixture. Typically, the polymers may contain polar groups. Suitable polymeric dispersants often possess a two-component structure comprising a polymeric chain and an anchoring group. The particular combination of these leads to their effectiveness.

Suitable commercially available polymeric dispersants are, for example, EFKA® 4046, 4047, 4060, 4300, 4330, 4580, 4585, 8512, Disperbyk® 161, 162, 163, 164, 165, 166, 168, 169, 170, 2000, 2001, 2050, 2090, 2091, 2095, 2096, 2105, 2150, Ajinomoto Fine Techno's PB® 711, 821, 822, 823, 824, 827, Lubrizol's Solsperse® 24000, 31845, 32500, 32550, 32600, 33500, 34750, 36000, 36600, 37500, 39000, 41090, 44000, 53095, ALBRITECT® CP30 (a copolymer of acrylic acid and acrylphosphonate) and combinations thereof.

Preference is given to polymers derived from hydroxyalkyl(meth)acrylates and/or polyglycol (meth)acrylates, such as hydroxyethyl and hydroxypropyl (meth)acrylate, polyethylene glycol (meth)acrylates, (meth)acrylates having amine functionality, for example, N-[3-(dimethylamino)propyl](meth)acrylamide or 2-(N,N-dimethylamino)ethyl (meth)acrylate.

In particular, non-ionic copolymer dispersants having amine functionality are preferred. Such dispersants are commercially available, for example as EFKA® 4300, EFKA® 4580 or EFKA 4585. The polymeric dispersants may be used alone or in admixture of two or more.

The dispersant may also be of non-polymeric nature, containing a functional group, having affinity to silver particles, such as, for example, a thiol or a disulfide group. Examples of such compounds include 2-mercaptoethanol, 4-mercapto-1-butanol, decanethiol, dodecanethiol, thiophenol, benzylthiol, dihydrolipoic acid and lipoic acid.

A photopolymerization-curable resin or an electron beam curable resin which is solvent-free may also be employed as a binder resin. The examples thereof include an acrylic resin, and specific examples of acrylic monomers commercially available are shown below.

A monofunctional acrylate monomer that may be used includes for example, 2-ethylhexyl acrylate, 2-ethylhexyl-EO adduct acrylate, ethoxydiethylene glycol acrylate, 2-hydroxyethyl acrylate, 2-hydroxypropyl acrylate, 2-hydroxyethyl acrylate-caprolactone adduct, 2-phenoxyethyl acrylate, phenoxydiethylene glycol acrylate, nonyl phenol-EO adduct acrylate, (nonyl phenol-EO adduct)-caprolactone adduct acrylate, 2-hydroxy-3-phenoxypropyl acrylate, tetrahydrofurfuryl acrylate, furfuryl alcohol-caprolactone adduct acrylate, acryloyl morpholine, dicyclopentenyl acrylate, dicyclopentanyl acrylate, dicyclopentenyloxyethyl acrylate, isobornyl acrylate, (4,4-dimethyl-1,3-dioxane)-caprolactone adduct acrylate, (3-methyl-5,5-dimethyl-1,3-dioxane)-caprolactone adduct acrylate, and the like.

A polyfunctional acrylate monomer that may be used includes hexanediol diacrylate, neopentyl glycol diacrylate, polyethylene glycol diacrylate, tripropylene glycol diacrylate, neopentyl glycol hydroxypivalate diacrylate, (neopentyl glycol hydroxy-pivalate)-caprolactone adduct diacrylate, (1,6-hexanediol diglycidyl ether)-acrylic acid adduct, (hydroxypivalaldehyde-trimethylolpropane acetal) diacrylate, 2,2-bis[4-(acryloyloxydiethoxy)phenyl]propane, 2,2-bis[4-(acryloyloxydiethoxy)phenyl]methane, hydrogenated bisphenol A-ethylene oxide adduct diacrylate, tricyclodecanedimethanol diacrylate, trimethylolpropane triacrylate, pentaerithritol triacrylate, (trimethylolpropane-propylene oxide) adduct triacrylate, glycerine-propylene oxide adduct triacrylate, a mixture of dipentaerithritol hexaacrylate and pentaacrylate, esters of dipentaerithritol and lower fatty acid and acrylic acid, dipentaerithritol-caprolactone adduct acrylate, tris(acryloyloxyethyl) isocyanurate, 2-acryloyloxyethyl phosphate, and the like.

With respect to inks of ultraviolet-irradiation type curing among these inks, a photopolymerization initiator, and depending on the needs therefor, a sensitizing agent, and auxiliary agents such as a polymerization inhibitor and a chain transfer agent, and the like may be added thereto.

With respect to photo-polymerization initiators, there are, (1) an initiator of direct photolysis type including an arylalkyl ketone, an oxime ketone, an acylphosphine oxide, or the like, (2) an initiator of radical polymerization reaction type including a benzophenone derivative, a thioxanthone derivative, or the like, (3) an initiator of cationic polymerization reaction type including an aryl diazonium salt, an aryl iodinium salt, an aryl sulfonium salt, and an aryl acetophenone salt, or the like, and in addition, (4) an initiator of energy transfer type, (5) an initiator of photoredox type, (6) an initiator of electron transfer type, and the like. With respect to the inks of electron beam-curable type, a photopolymerization initiator is not necessary and a resin of the same type as in the case of the ultraviolet-irradiation type inks can be used, and various kinds of auxiliary agent may be added thereto according to the needs therefor.

The coating or printing ink composition of the present invention can be used in the manufacture of a surface relief microstructure, especially an optically variable image (OVD, which also includes optically variable devices, such as, for example, a hologram). Reference is made to WO2005/051675, WO2008/061930 and WO2012/176126.

A further specific embodiment of the invention concerns a preferred method for forming a surface relief microstructure, especially an optically variable device (OVD) on a substrate comprising the steps of:

A) forming a surface relief microstructure, especially an OVD on a discrete portion of the substrate;
comprising
a1) applying a curable composition to at least a portion of the substrate;
a2) contacting at least a portion of the curable composition with a surface relief microstructure, especially OVD forming means; and
a3) curing the curable composition treated in step a2), B) applying a composition on at least part of the substrate, and/or optionally at least part of the surface relief microstructure, especially OVD obtained in step A), wherein the composition comprises
b1) a metal complex of formula $Ag^+L^-$ (I), wherein
$L^-$ is a group of formula

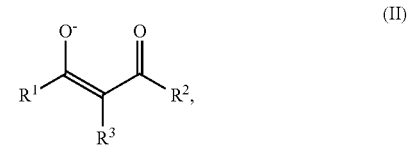

$R^1$ is a perfluoroalkyl group, or a $C_1$-$C_8$alkyl group, wherein part of the hydrogen atoms is replaced by fluorine atoms;

R² is a perfluoroalkyl group, a C₁-C₈alkyl group, a C₁-C₈alkyl group, wherein part of the hydrogen atoms is replaced by fluorine atoms; a phenyl group, which may optionally be substituted by one or more C₁-C₄alkyl groups, or C₁-C₄alkoxy groups; a C₂-C₅heteroaryl group, which may optionally be substituted by one or more C₁-C₄alkyl groups, or C₁-C₄alkoxy groups; or a C₁-C₈alkoxy group, R³ is a hydrogen atom, a fluorine atom, a chlorine atom, or a C₁-C₈alkyl group, or R² and R³ together form a cyclic or bicyclic ring, which may optionally be substituted by one or more C₁-C₄alkyl groups, b2) a solvent,
b3) a reducing agent, and
b4) optionally a polymeric binder, and
b5) optionally a dispersant, C) heating the coating obtained in step B) to a temperature below 120° C. and/or irradiating the coating with electromagnetic radiation, to form a highly reflective layer, containing silver nanoparticles.

To accomplish the alignment of the silver particles formed to the contours of a diffraction grating the ink (coating composition) preferably has a low binder and a low silver content.

Further details of such a method are described in FIG. 1 of WO08/061930, where certain substrates like paper, aluminium, or other opaque substrates (1) are printed with an ultra violet curable lacquer (2) on its lower surface. An optically variable device, a lens or an engraved structure is cast (3) into the surface of the lacquer (2) with a clear shim (4) having the optically variable device or other lens or engraved structure thereon. The optically variable device, lens or engraved structure image is imparted into the lacquer and instantly cured (6) via an UV lamp disposed through the shim (4) at normal processing speeds through polarizing lens (8), quartz roller (6), and clear polycarbonate roller (5). The optically variable device, lens or engraved structure image is a facsimile of the image on the clear shim. Metallic ink (9) is printed (10) over the optically variable device or other lens or engraved structure and causes the optically variable device, lens or engraved structure to become light reflective. Further colours (11) can be subsequently conventionally printed in-line at normal printing process speeds. In an alternative embodiment, the paper, aluminium, and all manner of other opaque substrate (1) is replaced with a filmic substrate. Such material is substantially transparent and therefore the image is visible from both sides of the surface.

The composition of the present invention may be applied to the substrate by means of conventional printing press such as gravure, flexographic, lithographic, offset, letterpress intaglio and/or screen process, or other printing process.

Other digital printing processes are also possible, such as ink jet processes.

In another embodiment, the composition may be applied by coating techniques, such as spraying, dipping, casting or spin-coating.

Preferably the printing process is carried out by flexographic, offset or by gravure printing.

The resulting products may be coated with a protective coating. The protective coating is preferably transparent or translucent. Examples for such coatings are known to the skilled person. For example, water borne coatings, UV-cured coatings or laminated coatings may be used. Examples for typical coating resins will be given below.

In a specific embodiment in the method as described in claim 1, steps A) to C) are repeated 1 to 5 times resulting in a multilayer metallic structure.

In some cases it might be suitable to apply a neutral or protective coating between the repeatedly applied metallic coatings. Suitable binders for such coatings are given below.

The (security, or decorative) product obtainable by using the above method forms a further subject of the present invention.

Accordingly, the present invention is directed to a security, or decorative element, comprising a substrate, which may contain indicia or other visible features in or on its surface, and on at least part of the said substrate surface an electrically non-conductive highly reflective layer, containing silver nanoparticles, which is obtainable according to the method of the present invention.

Typically the security product includes banknotes, credit cards, identification documents like passports, identification cards, driver licenses, or other verification documents, pharmaceutical apparel, software, compact discs, tobacco packaging and other products or packaging prone to counterfeiting or forgery.

The substrate may comprise any sheet material. The substrate may be opaque, substantially transparent or translucent, wherein the method described in WO08/061930 is especially suited for substrates, which are opaque to UV light (non-transparent). The substrate may comprise paper, leather, fabric such as silk, cotton, tyvac, filmic material or metal, such as aluminium. The substrate may be in the form of one or more sheets or a web.

The substrate may be mould made, woven, non-woven, cast, calendared, blown, extruded and/or biaxially extruded. The substrate may comprise paper, fabric, man made fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polythyleneterephthalate, polypropylene propafilm, polyvinylchloride, rigid PVC, cellulose, tri-acetate, acetate polystyrene, polyethylene, nylon, acrylic and polytherimide board. The polythyleneterephthalate substrate may be Melinex type film (obtainable from DuPont Films Willimington Delaware product ID Melinex HS-2), or oriented polypropylene.

The substrates being transparent films or non transparent substrates like opaque plastic, paper including but not limited to banknote, voucher, passport, and any other security or fiduciary documents, self adhesive stamp and excise seals, card, tobacco, pharmaceutical, computer software packaging and certificates of authentication, aluminium, and the like.

In a preferred embodiment of the present invention the substrate is a non-transparent (opaque) sheet material, such as, for example, paper. Advantageously, the paper may be precoated with an UV curable lacquer. Suitable UV curable lacquers and coating methods are described, for example, WO2015/049262 and WO2016/156286.

In another preferred embodiment of the present invention the substrate is a transparent or translucent sheet material, such as, for example, polyethylene terephthalate, polyethylene naphthalate, polyvinyl butyral, polyvinyl chloride, flexible polyvinyl chloride, polymethyl methacrylate, poly (ethylene-co-vinyl acetate), polycarbonate, cellulose triacetate, polyether sulfone, polyester, polyamide, polyolefins, such as, for example, polypropylene, and acrylic resins. Among these, polyethylene terephthalate and polypropylene are preferred. The flexible substrate is preferably biaxially oriented.

The forming of an optically variable image on the substrate may comprise depositing a curable composition on at least a portion of the substrate, as described above. The curable composition, generally a coating or lacquer may be deposited by means of gravure, flexographic, ink jet and screen process printing. The curable lacquer may be cured by actinic radiations, preferably ultraviolet (UV) light or electron beam. Preferably, the curable lacquer is UV cured. UV curing lacquers are well known and can be obtained from e.g. BASF SE. The lacquers exposed to actinic radiations or electron beam used in the present invention are required to reach a solidified stage when they separate again from the imaging shim in order to keep the record in their upper layer of the sub-microscopic, holographic diffraction grating image or pattern (optically variable image, OVI). Particularly suitable for the lacquer compositions are mixtures of typical well-known components (such as photoinitiators, monomers, oligomers. levelling agents etc.) used in the radiation curable industrial coatings and graphic arts. Particularly suitable are compositions containing one or several photo-latent catalysts that will initiate polymerization of the exposed lacquer layer to actinic radiations. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group, examples have already been given above. Further reference is made to pages 8 to 35 of WO2008/061930.

The UV lacquer may comprise an epoxy-acrylate from the CRAYNOR® Sartomer Europe range (10 to 60%) and one or several acrylates (monofunctional and multifunctional), monomers which are available from Sartomer Europe (20 to 90%) and one, or several photoinitiators (1 to 15%) such as Darocure® 1173 and a levelling agent such as BYK®361 (0.01 to 1%) from BYK Chemie.

The epoxy-acrylate is selected from aromatic glycidyl ethers aliphatic glycidyl ethers. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl] methane isomers (CAS No. [66072-39-7]), phenol-based epoxy novolaks (CAS No. [9003-35-4]), and cresol-based epoxy novolaks (CAS No. [37382-79-9]). Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The one or several acrylates are preferably multifunctional monomers which are selected from trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA) and or mixtures thereof.

The photoinitiator is preferably a blend of an alpha-hydroxy ketone, alpha-alkoxyketone or alpha-aminoketone compound and a benzophenone compound; or a blend of an alpha-hydroxy ketone, alpha-alkoxyketone or alpha-aminoketone compound, a benzophenone compound and an acylphosphine oxide compound.

The curable composition is preferably deposited by means of gravure or flexographic printing.

The curable composition can be coloured.

A filmic substrate is printed conventionally with a number of coloured inks, using, for example, a Cerutti R950 printer (available from Cerrutti UK Long Hanborough Oxon.). The substrate is then printed with an ultra violet curable lacquer. An OVD is cast into the surface of the curable composition with a shim having the OVD thereon, the holographic image is imparted into the lacquer and instantly cured via a UV lamp, becoming a facsimile of the OVD disposed on the shim.

The diffraction grating may be formed using any methods known to the skilled man such as those described in U.S. Pat. Nos. 4,913,858, 5,164,227, WO2005/051675 and WO2008/061930.

The curable coating composition may be applied to the substrate by means of conventional printing press such as gravure, rotogravure, flexographic, lithographic, offset, letterpress intaglio and/or screen process, or other printing process.

Preferably, when the substrate carrying the enhanced diffractive image or pattern is subsequently over-laid onto printed pictures and/or text, or the substrate is pre-printed with pictures and/or text and the enhanced diffractive image or pattern is deposited thereon, those printed features are visible through the substrate, provided that the substrate itself is at least opaque, translucent or transparent. Preferably the silver layer which is printed over the OVD, for example the diffraction grating is also sufficiently thin as to allow viewing in transmission and reflectance. In other words the whole security element on the substrate allows a viewing in transmission and reflectance.

In another preferred embodiment the security element comprises a mutlilayer structure capable of interference, wherein the multilayer structure capable of interference has a reflection layer, a dielectric layer, and a partially transparent layer (EP1504923, WO01/03945, WO01/53113, WO05/38136, WO16173696), wherein the dielectric layer is arranged between the reflection layer and the partially transparent layer and the reflective layer is formed by the highly reflective layer, containing silver nanoparticles, which is obtainable according to the method of the present invention.

Suitable materials for the absorber layer include an Ni/Cr/Fe semi-transparent alloy, chromium, nickel, aluminum, silver, copper, palladium, platinum, titanium, vanadium, cobalt, iron, tin, tungsten, molybdenum, rhodium, niobium, carbon, graphite, silicon, germanium and compounds, mixtures or alloys thereof. Suitable materials for the dielectric layer include silicium dioxide, zinc sulfide, zinc oxide, zirconium oxide, zirconium dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, selenium trioxide, tin oxide, tungsten trioxide and combinations thereof as well as organic polymer acrylates.

The absorber layer is preferably an Ni/Cr/Fe semi-transparent alloy and the dielectric layer is preferably formed of $SiO_2$.

Specific additives can be added to the curable composition to modify its chemicals and/or physical properties. Polychromatic effects can be achieved by the introduction of (colored) inorganic and/or organic pigments and/or solvent soluble dye-stuffs into the ink, to achieve a range of coloured shades. By addition of a dye the transmission colour can be influenced. By the addition of fluorescent or phosphorescent materials the transmission and/or the reflection colour can be influenced.

Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, the 2,9-dichloro-quinacridone in platelet form described in WO08/055807, or a mixture or solid solution thereof.

Plateletlike organic pigments, such as plateletlike quinacridones, phthalocyanine, fluororubine, dioxazines, red perylenes or diketopyrrolopyrroles can advantageously be used.

Suitable colored pigments also include conventional inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black and mixed metal oxides.

Examples of dyes, which can be used to color the curable composition, are selected from the group consisting of azo, azomethine, methine, anthraquinone, phthalocyanine, dioxazine, flavanthrone, indanthrone, anthrapyrimidine and metal complex dyes. Monoazo dyes, cobalt complex dyes, chrome complex dyes, anthraquinone dyes and copper phthalocyanine dyes are preferred.

The surface relief microstructures (optical microstructured devices (or images)) are composed of a series of structured surfaces. These surfaces may have straight or curved profiles, with constant or random spacing, and may even vary from microns to millimetres in dimension. Patterns may be circular, linear, or have no uniform pattern. For example a Fresnel lens has a microstructured surface on one side and a plane surface on the other. The microstructured surface consists of a series of grooves with changing slope angles as the distance from the optical axis increases. The draft facets located between the slope facets usually do not affect the optical performance of the Fresnel lens.

The surface relief microstructure is, for example, an optically variable device (OVD) such as, for example, a diffractive optical variable image (DOVI). The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.). Examples of an optically variable device are holograms or diffraction gratings, moire grating, lenses etc.

A further aspect of the present invention is the use of the element as described above for the prevention of counterfeit or reproduction, on a document of value, right, identity, a security label or a branded good.

Yet a further aspect of the invention is a (coating or printing ink) composition comprising b1) a metal complex of formula $Ag^+L^-$ (I), wherein $L^-$ is a group of formula

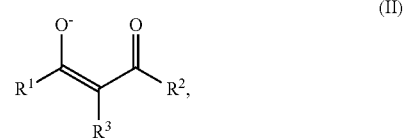

(II)

$R^1$ is a perfluoroalkyl group, or a $C_1$-$C_8$alkyl group, wherein part of the hydrogen atoms is replaced by fluorine atoms;

$R^2$ is a perfluoroalkyl group, a $C_1$-$C_8$alkyl group, a $C_1$-$C_8$alkyl group, wherein part of the hydrogen atoms is replaced by fluorine atoms; a phenyl group, which may optionally be substituted by one or more $C_1$-$C_4$alkyl groups, or $C_1$-$C_4$alkoxy groups; a $C_2$-$O_5$heteroaryl group, which may optionally be substituted by one or more $C_1$-$C_4$alkyl groups, or $C_1$-$C_4$alkoxy groups; or a $C_1$-$C_8$alkoxy group, $R^3$ is a hydrogen atom, a fluorine atom, a chlorine atom, or a $C_1$-$C_8$alkyl group, or $R^2$ and $R^3$ together form a cyclic or bicyclic ring, which may optionally be substituted by one or more $C_1$-$C_4$alkyl groups, b2) a solvent, b3) a reducing agent, and b4) optionally a polymeric binder, and b5) optionally a dispersant, with the proviso that the solvent is different from the reducing agent.

The preferences for components b1) to b5) have already been described above.

Preferably, the (coating or printing ink) composition comprises a metal complex of formula Ag$^+$L$^-$ (I), wherein L$^-$ is the deprotonated form of the below-mentioned compounds of formula H$^+$L$^-$:

(5,5-dimethyl-1,1,1-trifluoro-2,4-hexanedione)

(6,6-dimethyl-1,1,1,2,2-pentafluoro-3,5-heptanedione)

(7,7-dimethyl-1,1,1,2,2,3,3-heptafluoro-4,6-octanedione)

(1,7,7-trimethyl-3-(2,2,2-trifluoracetyl)norbornan-2-one)

(1,1,1-trifluoro-2,4-pentanedione)

(1,1,1,2,2-pentafluoro-2,4-hexanedione)

(1,1,1,2,2,3,3-heptafluoro-2,4-heptanedione (5,5,6,6,7,7,8,8,8-nonafluorooctane-2,4-dione)

(5,5,6,6,7,7,8,8,9,9,9-undecafluorononane-2,4-dione)

(1,1,1,3,5,5,5-heptafluoro-2,4-pentanedione)

(1,1,1,5,5,5-hexafluoro-2,4-pentanedione)

1,1,1,5,5,6,6,6-octafluoro-2,4-hexanedione (4H,4H-perfluoroheptane-3,5-dione)

(5H,5H-perfluorononae-4,6-dione)

(4,4,4-trifluoro-1-phenyl-1,3-butanedione)

(1-(4-methoxyphenyl)-4,4,4-trifluorobutanedione)

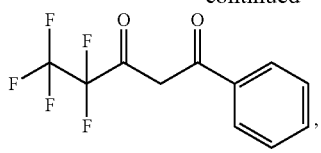

(1-phenyl-2H,2H-perfluoropentane-1,3-dione)

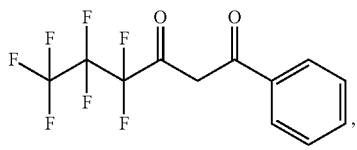

(1-phenyl-2H,2H-perfluorohexane-1,3-dione)

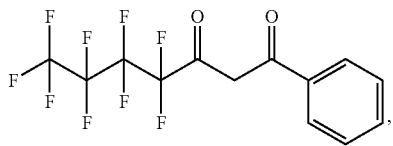

(1-phenyl-2H,2H-perfluoroheptane-1,3-dione)

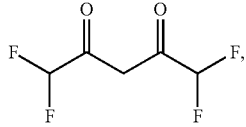

(1,1,5-5-tetrafluoropentane-2,4 dione)

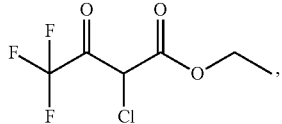

(ethyl-2-chloro-4,4,4-trifluoroacetoacetate)

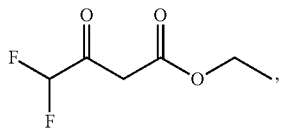

(ethyl-4,4-difluoroacetoacetate)

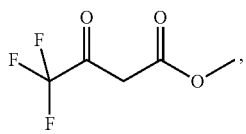

(methyl 4,4,4-trifluoro-3-oxo-butanoate)

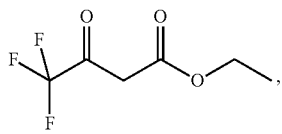

(ethyl 4,4,4-trifluoro-3-oxo-butanoate)

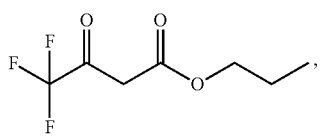

(propyl-4,4,4-trifluoroacetoacetate)

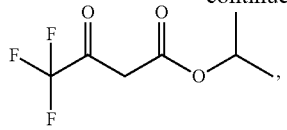

(isopropyl-4,4,4-trifluoroacetoacetate)

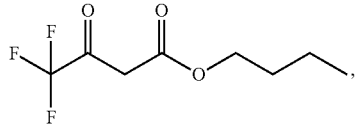

(butyl-4,4,4-trifluoroacetoacetate)

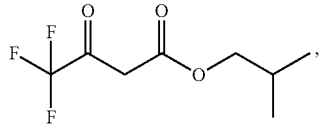

(isobutyl-4,4,4-trifluoroacetoacetate)

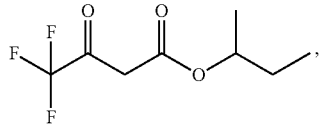

(sec-butyl-4,4,4-trifluoroacetoacetate)

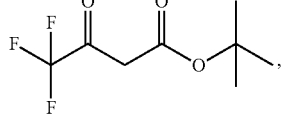

(tert-butyl-4,4,4-trifluoroacetoacetate)

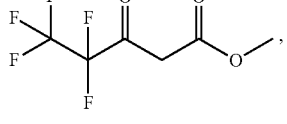

(methyl-4,4,5-5,5-pentafluoro-3-oxopentanoate)

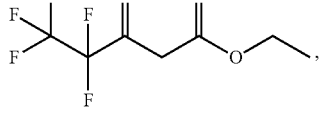

(ethyl-4,4,5,5,5-pentafluoro-3-oxopentanoate)

b2) alcohols (such as methanol, ethanol, 1-propanol, 2-propanol, 1-butanol, 2-butanol, isobutanol, tert-butanol, tert-pentanol), cyclic or acyclic ethers (such as diethyl ether, tetrahydrofuran and 2-methyltetrahydrofurane), ketones (such as acetone, 2-butanone, 3-pentanone), ether-alcohols (such as 2-methoxyethanol, 1-methoxy-2-propanol, ethylene glycol monobutyl ether, diethylene glycol monoethyl ether, diethylene glycol monopropyl ether, and diethylene glycol monobutyl ether), esters (such as ethyl acetate, ethyl propionate, and ethyl 3-ethoxy-propionate), polar aprotic solvents (such as acetonitrile, dimethyl formamide, and dimethyl sulfoxide), mixtures thereof and mixtures with water, and b3) the reducing agent is selected from a 1,2-diol, such as glycerol, ethylene glycol, 1,2-propandiol, 1,2-butanediol, 1,2-pentanediol, 1,2-hexanediol, 2,3-butanediol, cis- or trans-1,2-cyclopentanediol, cis- or trans-1,2-cyclohexanediol, and an aldehyde, such as glutaric dialdehyde.

The composition normally comprises:

a total content of metal complex of formula (I) of from 0.1 to 60% by weight, preferably 0.5 to 40% by weight, more preferably 1 to 30% by weight based on the total weight of the composition.

a total content of solvent of from 10 to 99.5% by weight, preferably 50 to 99% by weight based on the total weight of the composition.

a total content of the reducing agent of from 0.01 to 50% by weight, preferably 0.01 to 30% by weight, more preferably 0.01 to 10% by weight based on the total weight of the composition.

a total content of a polymeric binder of from 0 to 40% by weight, preferably 0 to 20% by weight, more preferably 1 to 10% by weight based on the total weight of the composition.

a total content of dispersant of from 0 to 40% by weight, preferably 0 to 10% by weight, more preferably 0 to 5% by weight based on the total weight of the composition.

Various aspects and features of the present invention will be further discussed in terms of the examples. The following examples are intended to illustrate various aspects and features of the present invention.

EXAMPLES

Example 1

General Procedure 116 mg (0.5 mmol) of $Ag_2O$ was added to 2.5 g of iso-propanol, followed by 1.2 mmol of one of the compounds X (see Table 1) and the mixture was stirred for 30 min at 25° C. for dissolution of $Ag_2O$. After that, 46 mg (0.5 mmol) of glycerol was added, followed by addition of iso-propanol such as to adjust the Ag concentration in the mixture to 3% w/w. The mixture was filtered through 0.45 µm PTFE syringe filter and coated onto flexible PET-foil substrate (Melinex 506) using a wired rackle hand-coater #1. Coating was dried and cured in the oven at 85° C. for 20 sec. Gloss measurements were carried out using a glossmeter Zehntner 1110. Coloristic measurements were carried out using a spectrophotometer XRITE SP68 at 10° observation angle over white background.

TABLE 1

Gloss and coloristic data obtained with samples from Example 1.

| Sample | Structure of compound X | Gloss (20° angle) | L* (over white) | C* (over white) | h (over white) |
|---|---|---|---|---|---|
| 0.0 | Melinex 506 (blank substrate) | 227 | — | — | — |
| 1.1 | camphor-derived trifluoroacetyl ketone (bicyclic diketone with CF₃ group and gem-dimethyl, methyl substituents) | 591 | 73.3 | 17.8 | 64.4 |
| 2.1 | ethyl 4,4,4-trifluoro-3-oxobutanoate (CF₃–C(O)–CH₂–C(O)–O–Et) | 420 | 70.5 | 8.8 | 95.6 |
| 3.1 | hexafluoroacetylacetone (CF₃–C(O)–CH₂–C(O)–CF₃) | 623 | 71.5 | 12.1 | 79.2 |
| 4.1 | 1,1,1-trifluoro-2,4-pentanedione (CF₃–C(O)–CH₂–C(O)–CH₃) | 432 | 71.7 | 9.9 | 92.6 |
| 5.1 | 4,4,4-trifluoro-1-phenyl-1,3-butanedione (CF₃–C(O)–CH₂–C(O)–Ph) | 549 | 69.3 | 10.7 | 88.4 |

As can be seen from the data in Table 1, higly reflective coatings can be obtained upon coating and curing the compositions of the present invention at a temperature as low as 85° C.

Example 2

116 mg (0.5 mmol) of $Ag_2O$ was added to 2.5 g of iso-propanol, followed by 1.2 mmol of one of the compounds X (see Table 2) and the mixture was stirred for 30 min at 25° C. for dissolution of $Ag_2O$. After that, 200 mg of glutaric dialdehyde (50% solution in water, 1 mmol of dialdehyde) was added, followed by addition of iso-propanol such as to adjust the Ag concentration in the mixture to 3% w/w. The mixture was filtered through 0.45 μm PTFE syringe filter and coated onto flexible PET-foil substrate (Melinex 506) using a wired rackle hand-coater #1. Coating was dried and cured in the oven at 85° C. for 20 sec. Gloss measurements were carried out using a glossmeter Zehntner 1110. Coloristic measurements were carried out using a spectrophotometer X-RITE SP68 at 10° observation angle over white background.

TABLE 2

Gloss and coloristic data obtained with samples from Example 2.

| Sample | Structure of compound X | Gloss (20° angle) | L* (over white) | C* (over white) | h (over white) |
|---|---|---|---|---|---|
| 0.0 | Melinex 506 (blank PET substrate) | 227 | — | — | — |
| 1.2 | F$_3$C-C(O)-CH$_2$-C(O)-O-Et | 466 | 76.2 | 31.4 | 59.4 |
| 2.2 | CF$_3$-C(O)-CH$_2$-C(O)-CF$_3$ | 322 | 69.1 | 13.6 | 86.9 |
| 3.2 | CF$_3$-C(O)-CH$_2$-C(O)-CH$_3$ | 488 | 68.7 | 20.8 | 66.1 |

As can be seen from the data in Tables 1 and 2, with a composition according to the present invention, a highly reflective (high gloss value at 20°) coating can be obtained.

Example 3

116 mg (0.5 mmol) of $Ag_2O$ was added to 2.5 g of iso-propanol, followed by 221 mg (1.2 mmol) of ethyl 4,4,4-trifluoro-3-oxo-butanoate and the mixture was stirred for 30 min at 25° C. for dissolution of $Ag_2O$. After that, 18.4 mg (0.2 mmol) of glycerol was added, followed by addition of iso-propanol such as to adjust the Ag concentration in the mixture to 3% w/w. The mixture was filtered through 0.45 μm PTFE syringe filter and coated onto flexible PET-foil substrate (Melinex 506) using a wired rackle hand-coaters #1 and #2. Coating was dried and cured in the oven at 85° C. for 20 sec. Gloss measurements were carried out using a glossmeter Zehntner 1110.

The following values for gloss at 20° angle were obtained:

Hand-coater #1: Gloss (20° angle): 765

Hand-coater #2: Gloss (20° angle): 1010

The invention claimed is:

1. A method for forming a highly reflective silver nanoparticle-comprising layer on a substrate, the method comprising:
   A) optionally forming surface relief microstructure on a discrete portion of the substrate;
   B) applying a composition on at least part of the substrate, and/or optionally at least part of the surface relief microstructure if the surface relief microstructure is formed in A), to obtain a coating, wherein the composition comprises
      b1) a metal complex of formula (I), $$Ag^+L^-\quad(I)$$

wherein $L^-$ is a group of formula

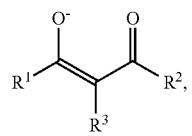

(II)

wherein $R^1$ is a perfluoroalkyl group, or a $C_1$-$C_8$alkyl group wherein a hydrogen atom is replaced by a fluorine atom;

$R^2$ is a perfluoroalkyl group, a $C_1$-$C_8$alkyl group, a $C_1$-$C_8$alkyl group wherein a hydrogen atom is replaced by a fluorine atom, a phenyl group which may optionally be substituted by at least one $C_1$-$C_4$alkyl or $C_1$-$C_4$alkoxy group, a $C_2C_5$heteroaryl group which may optionally be substituted at least one $C_1$-$C_4$alkyl or $C_1$-$C_4$alkoxy group, or a $C_1$-$C_8$alkoxy group;

$R^3$ is a hydrogen atom, a fluorine atom, a chlorine atom, or a $C_1$-$C_8$alkyl group; or $R^2$ and $R^3$ together form a cyclic or bicyclic ring, which may optionally be substituted by at least one $C_1$-$C_4$alkyl group, b2) a solvent, b3) a reducing agent, wherein the reducing agent is a 1,2-diol, or an aldehyde, b4) optionally a polymeric binder, and b5) optionally a dispersant, and C) heating the coating obtained in B) to a temperature below 120° C. and/or irradiating the coating with electromagnetic radiation, to form a highly reflective layer, comprising silver nanoparticles, wherein the highly reflective layer comprising silver nanoparticles is non-conductive, and wherein the highly reflective layer has a resistance of greater than $1*10^3$ Ω/sq as measured by a four-point probe method.

2. The method according to claim 1, wherein the metal complex of formula (I) is prepared in situ from a silver compound which is selected from silver oxide, silver hydroxide, silver complexes with non-fluorinated beta-diketones and beta-ketoesters and mixtures thereof, and a compound of formula wherein $H^+L^-$ is as defined in claim 1.

3. The method according to claim 1, wherein the solvent is selected from alcohols, cyclic or acyclic ethers, ketones, ether-alcohols, esters, polar aprotic solvents, mixtures thereof and mixtures with water.

4. The method according to claim 1, wherein the reducing agent is glutaric dialdehyde.

5. The method according to claim 1, wherein the binder comprises nitrocellulose, ethyl cellulose, cellulose acetate, cellulose acetate propionate (CAP), cellulose acetate butyrate (CAB), hydroxyethyl cellulose, hydroxypropyl cellulose, alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polyethyleneterephthalate, terpene phenol, polyolefin, silicone, cellulose, polyamide, polyester, rosin ester resins, shellac or a mixture thereof.

6. The method according to claim 1, wherein A) is performed and comprises:

a1) applying a curable composition to at least a portion of the substrate;

a2) contacting at least a portion of the curable composition with surface relief microstructure; and a3) curing the curable composition treated in a2).

7. The method according to claim 1, wherein a protective coating is applied on the layer obtained in C).

8. A security, or decorative article, comprising a substrate which optionally comprises indicia or other visible features in or on a surface, and which comprises on at least part of the surface, a silver layer which is obtained by the method according to claim 1.

9. A method of preventing counterfeit or reproduction, of a document of value, right, and/or identity, a security label or a branded good, the method comprising contacting the document, the security label or the branded good with the security, or decorative article of claim 8.

10. The method according to claim 2, wherein the compound of formula $H^+L^-$ is selected from:

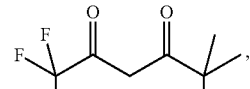

(5,5-dimethyl-1,1,1-trifluoro-2,4-hexanedione)

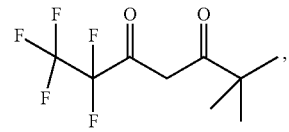

(6,6-dimethyl-1,1,1,2,2-pentafluoro-3,5-heptanedione)

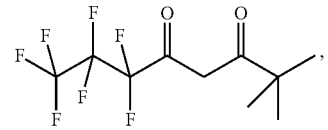

(7,7-dimethyl-1,1,1,2,2,3,3-heptafluoro-4,6-octanedione)

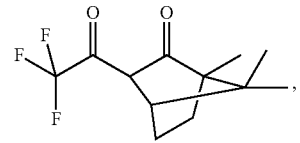

(1,7,7-trimethyl-3-(2,2,2-trifluoracetyl)norbornan-2-one)

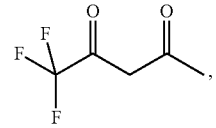

(1,1,1-trifluoro-2,4-pentanedione)

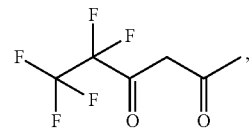

(1,1,1,2,2-pentafluoro-2,4-hexanedione)

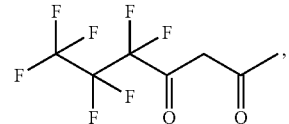

(1,1,1,2,2,3,3-heptafluoro-2,4-heptanedione

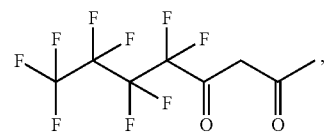

(5,5,6,6,7,7,8,8,8-nonafluorooctane-2,4-dione)

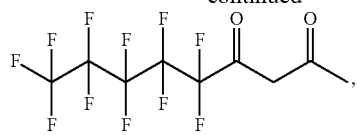

(5,5,6,6,7,7,8,8,9,9,9-undecafluorononane-2,4-dione)

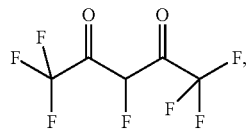

(1,1,1,3,5,5,5-heptafluoro-2,4-pentanedione)

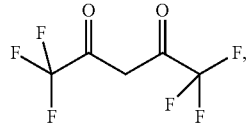

(1,1,1,5,5,5-hexafluoro-2,4-pentanedione)

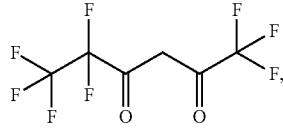

1,1,1,5,5,6,6,6-octafluoro-2,4-hexanedione

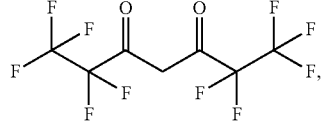

(4H,4H-perfluoroheptane-3,5-dione)

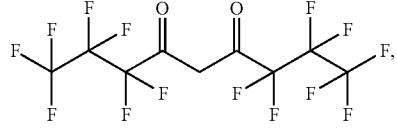

(5H,5H-perfluorononae-4,6-dione)

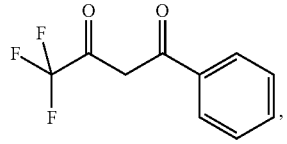

(4,4,4-trifluoro-1-phenyl-1,3-butanedione)

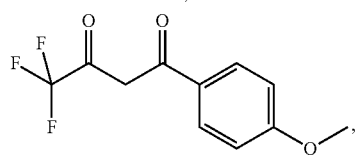

(1-(4-methoxyphenyl)-4,4,4-trifluorobutanedione)

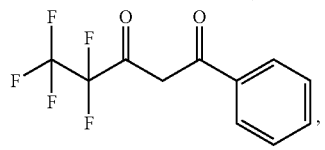

(1-phenyl-2H,2H-perfluoropentane-1,3-dione)

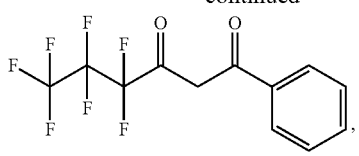

(1-phenyl-2H,2H-perfluorohexane-1,3-dione)

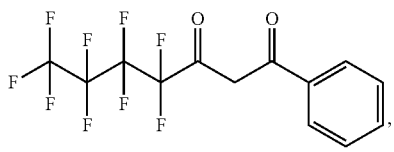

(1-phenyl-2H,2H-perfluoroheptane-1,3-dione)

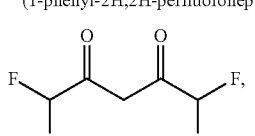

(1,1,5-5-tetrafluoropentane-2,4 dione)

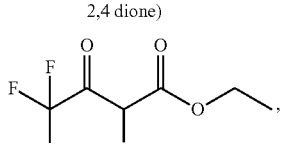

(ethyl-2-chloro-4,4,4-trifluoroacetoacetate)

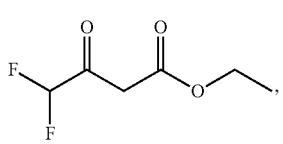

(ethyl-4,4-difluoroacetoacetate)

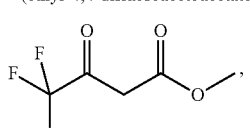

(methyl 4,4,4-trifluoro-3-oxo-butanoate)

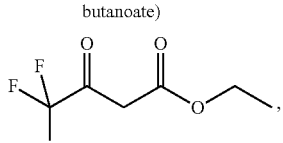

(ethyl 4,4,4-trifluoro-3-oxo-butanoate)

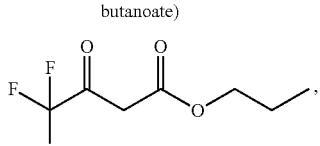

(propyl-4,4,4-trifluoroacetoacetate)

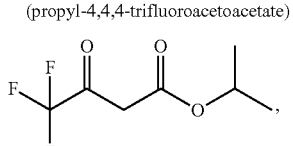

(isopropyl-4,4,4-trifluoroacetoacetate)

-continued
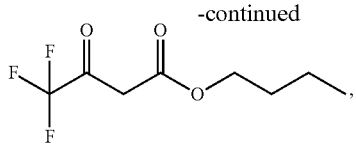
(butyl-4,4,4-trifluoroacetoacetate)
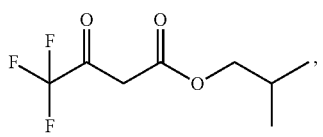
(isobutyl-4,4,4-trifluoroacetoacetate)
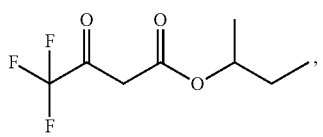
(sec-butyl-4,4,4-trifluoroacetoacetate)
-continued
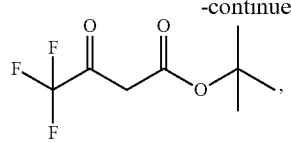
(tert-butyl-4,4,4-
trifluoroacetoacetate)
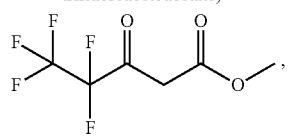
(methyl-4,4,5-5,5-pentafluoro-
3-oxopentanoate)
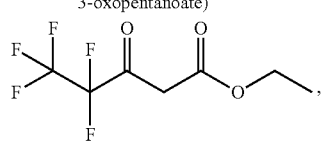
(ethyl-4,4,5,5,5-pentafluoro-3-
oxopentanoate)
and mixtures thereof.
* * * * *